US009567237B2

(12) United States Patent
Nalewajek et al.

(10) Patent No.: US 9,567,237 B2
(45) Date of Patent: Feb. 14, 2017

(54) SEPARATION AND RECOVERY OF MOLYBDENUM VALUES FROM URANIUM PROCESS DISTILLATE

(71) Applicant: Honeywell International Inc., Morristown, NJ (US)

(72) Inventors: David Nalewajek, West Seneca, NY (US); Kent Beckman, Paducah, KY (US)

(73) Assignee: Honeywell International Inc., Morris Plains, NJ (US)

( * ) Notice: Subject to any disclaimer, the term of this patent is extended or adjusted under 35 U.S.C. 154(b) by 790 days.

(21) Appl. No.: 14/079,351

(22) Filed: Nov. 13, 2013

(65) Prior Publication Data
US 2014/0140905 A1 May 22, 2014

Related U.S. Application Data

(60) Provisional application No. 61/727,580, filed on Nov. 16, 2012.

(51) Int. Cl.
C01G 39/00 (2006.01)
C01G 43/00 (2006.01)
C01G 43/06 (2006.01)

(52) U.S. Cl.
CPC ............. C01G 43/063 (2013.01); C01G 39/00 (2013.01); C01G 43/00 (2013.01); C01P 2006/80 (2013.01)

(58) Field of Classification Search
CPC ........................... C01G 43/063; C01G 43/066
USPC ................................................ 203/5, 71, 73
See application file for complete search history.

(56) References Cited

U.S. PATENT DOCUMENTS

| 2,953,431 | A | * | 9/1960 | Townend | ............. | C01G 43/063 203/39 |
|---|---|---|---|---|---|---|
| 3,046,089 | A | | 7/1962 | Steindler | | |
| 3,208,815 | A | | 9/1965 | Bourgeois | | |
| 3,383,183 | A | | 5/1968 | Grant | | |
| 3,790,658 | A | | 2/1974 | Fox et al. | | |
| 3,806,579 | A | | 4/1974 | Carles et al. | | |
| 4,011,296 | A | | 3/1977 | Ruiz et al. | | |
| 4,092,399 | A | | 5/1978 | Narayan et al. | | |
| 4,199,551 | A | | 4/1980 | Laferty et al. | | |
| 4,304,757 | A | | 12/1981 | Kuehl et al. | | |
| 4,366,126 | A | | 12/1982 | Gardner | | |
| 4,375,452 | A | | 3/1983 | Jan et al. | | |
| 4,381,286 | A | | 4/1983 | Floreancig | | |
| 4,393,028 | A | | 7/1983 | Crossley | | |
| 4,407,781 | A | | 10/1983 | Crossley et al. | | |
| 4,584,184 | A | | 4/1986 | Nalewajek et al. | | |
| 4,587,109 | A | | 5/1986 | Lyaudet et al. | | |
| 4,701,308 | A | | 10/1987 | Koehly et al. | | |
| 5,229,086 | A | | 7/1993 | Lam et al. | | |
| 5,431,891 | A | | 7/1995 | Gabriac et al. | | |
| 5,666,639 | A | | 9/1997 | Eerkens et al. | | |
| 2006/0057042 | A1 | | 3/2006 | Amamoto et al. | | |

FOREIGN PATENT DOCUMENTS

| BE | 562286 A | 6/1960 |
|---|---|---|
| CN | 86103859 A | 2/1987 |
| CN | 1075338 A | 8/1993 |
| CN | 1343261 A | 4/2002 |
| CN | 101827788 A | 9/2010 |
| CN | 102153143 A | 8/2011 |
| CN | 102473467 A | 5/2012 |
| CN | 102741433 A | 10/2012 |
| CN | 102753711 A | 10/2012 |
| CN | 103894155 A | 7/2014 |
| EP | 0209470 B1 | 3/1989 |
| EP | 0925255 B1 | 3/2000 |
| GB | 858161 A | 1/1961 |
| GB | 893320 A | 4/1962 |
| WO | WO9738785 A1 | 10/1997 |

OTHER PUBLICATIONS

POT ISR & Written Opinion issued in PCT/US2013/070001 dated Aug. 21, 2014.
Watanabe et al., "Adsorption of Molybdenum Hexafluoride on Magnesium Difluoride for Uranium Purification in FLUOREX Reprocessing", Journal of Nuclear Science and Technology (2011), vol. 48, No. 12, pp. 1413-1419.
Kuhrt et al., "Separation of Molybdenum Hexafluoride and Uranium Hexafluoride by Sorption on Sodium Fluoride in the Context of Dry Reprocessing of Nuclear Fuels Containing Thorium", Kerntechnik (1971), vol. 13, No. 1, pp. 17-20.
Mears et al., "Removal of Some Volatile Impurities From Uranium Hexafluoride", Journal of Industrial and Engineering Chemistry (1958), vol. 50, pp. 1771-1773.
International Search Report and Written Opinion] issued in PCT/US2013/070001, dated Aug. 21, 2014, 10 pages.
Supplemental European Search Report issued in EP Application 13886008.5, mailed May 20, 2016, 8 pages.

* cited by examiner

Primary Examiner — Krishnan S Menon
Assistant Examiner — Bradley R Spies
(74) Attorney, Agent, or Firm — Honeywell/Faegre

(57) ABSTRACT

A method for treating process distillate heavies produced during uranium fluoride purification is described. The heavies contain primarily uranium hexafluoride, $UF_6$, and molybdenum oxytetrafluoride, $MoOF_4$. The uranium hexafluoride is removed via distillation at reduced pressure leaving essentially $MoOF_4$ containing <0.1% of residual uranium hexafluoride. This mixture is hydrolyzed in water, then treated with a solution of sodium hydroxide until a pH of at least 7.5 is reached. The precipitated sodium diuranate and sodium fluoride are removed by filtration. The filtrate is reacted with calcium chloride to precipitate the molybdenum values as calcium molybdate containing trace quantities of calcium fluoride.

19 Claims, No Drawings

SEPARATION AND RECOVERY OF MOLYBDENUM VALUES FROM URANIUM PROCESS DISTILLATE

CROSS REFERENCE TO RELATED APPLICATION

The present application claims the benefit of U.S. Provisional Patent Application No. 61/727,580, filed on Nov. 16, 2012, the disclosure of which is incorporated herein by reference in its entirety.

FIELD OF THE INVENTION

The present invention relates to a method for recovering the molybdenum and uranium values from process heavy distillate generated during production of nuclear grade uranium hexafluoride. More specifically, the present invention relates to a method for separating the molybdenum and uranium values from such processes into compounds which can be conveniently separated from each other, and from fluoride impurities, in sufficient purity to be sold or recycled for use in manufacturing processes.

BACKGROUND OF THE INVENTION

In the production of nuclear grade uranium hexafluoride, crude $UF_6$ containing small amounts of vanadium, titanium, and to a greater extent, molybdenum are vaporized and fed into a boiler still for processing. While the low boiling impurities, i.e. HF, $VOF_3$ and $MoF_6$, are easily removed before the distillation of $UF_6$ commences, the molybdenum contamination which exists as molybdenum oxytetrafluoride, $MoOF_4$, remains. Continuous batch-to-batch refinement of crude uranium hexafluoride results in the accumulation of molybdenum impurity in the high boiler still bottom. At some point, co-distillation of the molybdenum impurity with the $UF_6$ occurs, and the $UF_6$ composition containing the $MoOF_4$ fails to meet regulatory specifications. This molybdenum-containing $UF_6$ composition must then be disposed, or stored until a suitable recovery technology is developed. Capturing the uranium values and/or the molybdenum values would enhance the economics of the $UF_6$ production process.

Conventional separation methods for recovering uranium values from acid leach liquors are known. Generally, these processes utilize either ion exchange or solvent extraction technology. However, these methods are difficult to implement in the presence of high molybdenum and fluoride ion concentrations, as would be the case when using such methods to treat the molybdenum-containing $UF_6$ composition.

The prior art has recognized a need for removing molybdenum from uranium. However, prior art methods have not addressed the problem of molybdenum recovery. Such methods include the ion-exchange work of Fox et al. in U.S. Pat. No. 3,790,658; Ruiz et al. U.S. Pat. No. 4,092,399 or Kuehl et al. in U.S. Pat. No. 4,304,757. The limitations of these methods for reclamation of metal values to treat the molybdenum-containing $UF_6$ composition are pronounced. For example, it is well known that molybdenum will react similarly to uranium in forming anionic complexes which will be adsorbed on resins. As the molybdenum values continue to increase on the resin, a decrease in the total uranium capacity results. In practice, efforts are made to control the molybdenum concentration by blending ore leachates to keep the levels of molybdenum in the range of 0.01 to 0.02 grams per liter. However, in dealing with composition of the molybdenum-containing $UF_6$ composition addressed by the present invention, concentrations of up to 90% by weight of molybdenum or higher may be present. Clearly, dilution to achieve separation by these methods is not economical.

Of much greater concern is the high fluoride ion concentration produced during hydrolysis of the process heavies for this system. It has been found that premature breakthrough of uranium and molybdenum occurs when high concentrations of fluoride ion (>=1000 ppm) is present. This inevitably results in an unacceptably high cross contamination factor for the reprocessed metals as well as a final product which contains fluoride ion exceeding the tolerance limits. An alternative process is needed.

Attempts to use conventional solvent extraction technology such as that described in U.S. Pat. No. 4,011,296 results in limited practicality. High concentrations of molybdenum in the process waste build up in the amine extractant and act as a "poison" in a manner similar to that observed with the ion exchange resins. This usually occurs when the concentration of molybdenum exceeds 0.03 g per liter of organic phase. Eventually, a maximum tolerance level is reached after which point precipitation of complex amine heteropolymolybdates occurs. The precipitate forms at the organic-aqueous interface as a gummy mass which seriously interferes with the operation. Compounding the problem is the high fluoride ion concentration present when the molybdenum-containing $UF_6$ composition is treated by such a process. The formation of uranyl fluorides is possible, thus causing these complexes to be retained in the organic phase during stripping. The result is an unacceptable cross-contamination level in the recovered metals. The high fluoride ion concentration also augments the problem by interfering with a rapid phase separation.

An attempt was made to use the precipitation technique disclosed by Crossley in U.S. Pat. No. 4,393,028; however, the technique was found to be incompatible for use with the molybdenum-containing $UF_6$ composition. Undesirable cations deleterious to the recycling of the uranium values are introduced and all products become cross contaminated with fluoride containing compounds to an extent which prevents recycling or resale of the product.

Even a previous patented process for recovering these metal values, see U.S. Pat. No. 4,584,184, which is incorporated herein by reference, requires the use of large quantities of organic alcohols, which due to changing environmental regulations is no longer a desirable process. It is therefore apparent, that a method to recover the molybdenum and uranium values from molybdenum-containing $UF_6$ compositions avoiding the use of any organic substrates would be most desirable.

BRIEF SUMMARY OF THE INVENTION

It is a first object of the present invention to provide a $UF_6$ production process which includes the recovery of uranium values from high boiler still bottoms by distillation at reduced pressures. Preferably this process is performed outside of the presence of organic (carbon) containing substances so as to prevent the formation of fluorinated organic waste products.

It is a second object of the present invention to recover molybdenum values from a $UF_6$ production process at a purity which can be sold or disposed of as non-hazardous, non-nuclear waste. Preferably, molybdenum and the molybdenum values are reclaimed as molybdenum salt, and even more preferably, calcium molybdate, which has many commercial uses.

Similarly, it is a third object of the present invention to recover uranium and/or molybdenum values from a composition comprising, consisting essentially of, or consisting of, $UF_6$ and $MoOF_4$.

DETAILED DESCRIPTION

The present invention provides a method of separating and recovering molybdenum and uranium values from process still high boilers generated during the manufacturing of nuclear grade uranium hexafluoride. Important aspects of the invention reside in the fact that both the molybdenum and uranium values can be recovered in sufficient purity to be recycled or sold. The expense of storage or disposal in a low level nuclear waste burial site is eliminated.

As discussed earlier, in one method for the production of nuclear grade uranium hexafluoride, crude $UF_6$ containing small amounts of vanadium, titanium, and to a greater extent, molybdenum are vaporized and fed into a boiler still for processing. This distillation is conducted at elevated pressures, i.e., pressures significantly above atmospheric pressure, such that the $UF_6$ can exist in liquid form.

After co-distillation of the molybdenum impurity with the $UF_6$ occurs during the elevated pressure distillation process, according to one aspect of the present invention, process still high boilers which comprise UF6 and $MoOF_4$ are then subjected to distillation at reduced pressure, i.e., at under 90 kPa. Preferably the distillation is conducted at pressures lower than about 50 kPa, and most preferably, the distillation is conducted at pressures between about 20 kPa and about 35 kPa, e.g., at about 28 kPa (or, about 210 mmHg). The distillation is conducted at a suitable temperature for such distillation, e.g., at 60° C. for distillation at 210 mmHg). The bulk of the $UF_6$ contained in the high boiling still is removed during this step.

Then, the resulting solid which remains in the still is then hydrolyzed using water to solubilize any remaining material. This solution now contains hydrofluoric acid, the hydrolyzed molybdenum, and any remaining uranium as uranyl fluoride, $UO_2F_2$.

Since one objective of the present invention is to provide for a process that results in the isolation of the molybdenum value substantially free of uranium and containing a minimal quantity of fluoride, the hydrolyzed solution is reacted with sodium hydroxide to precipitate remaining uranium as the insoluble salt, sodium diuranate, $Na_2U_2O_7$ and most of the fluoride, preferably at least 95%, as sodium fluoride, NaF. The molybdenum remains in solution as the soluble salt, sodium molybdate, $Na_2MoO_4$.

The molybdenum can be recovered by treating the liquor from the uranium and fluoride removal step with a solution of calcium chloride which converts the soluble sodium molybdate into the insoluble calcium salt, calcium molybdate, $CaMoO_4$. This salt is isolated by filtration and drying and is suitable for use in many applications, ranging from soil additives, enamel bonding agents, protective and decorative metal coatings, iron and steel alloys, lubricants, petroleum refining catalysts, phosphomolybdic and phosphotungstic toners, pigments, corrosion inhibitors, smoke suppressants, and the production of molybdenum metal for the electronics, electrical, and refractory metals industries. Preferably, the isolated salt contains less than about 300 ppm uranium such that the salt can be disposed of safely as non-hazardous and/or non-nuclear waste. Even more preferably, the isolated salt contains less than 10, or even 1 ppm uranium, so that it is readily saleable and usable in a number of commercial applications.

If desired, the uranium values contained in the sodium diuranate salt/sodium fluoride mixture can recovered and recycled by using standard process chemistry known to those skilled in the art.

In a first preferred embodiment of the present invention, process still high boilers consisting of uranium hexafluoride, $UF_6$ and molybdenum oxytetrafluoride, $MoOF_4$ are subjected to distillation at 60° C. and 210 mm Hg to remove the bulk amount of the uranium hexafluoride contained in the high boiler mixture. The residue remaining after the distillation is subjected to hydrolysis using water. The quantity of water is not critical but should be sufficient to dissolve the solids. Typically a mass ratio of 1:1 solids to water is adequate. The resulting highly acidic solution is treated with a 20 wt % solution of sodium hydroxide until the pH is 7.5 or higher. The concentration of sodium hydroxide is not critical. Solutions ranging from 5% to 50% can be used. Dilute concentrations require larger reaction vessels and can add to the amount of sodium fluoride which contaminates the final molybdenum product as sodium fluoride has a slight solubility in water, while concentrations can require the use of additional cooling equipment to compensate for the heat generated during the neutralization step. The addition of sodium hydroxide precipitates any remaining uranium as the insoluble salt, sodium diuranate, $Na_2U_2O_7$. Also precipitated during this step is at least 95% of the contained fluoride ion as the partially soluble salt, sodium fluoride, NaF. These salts are removed from the liquor which contains the molybdenum values by standard filtration techniques. These solids can be used as is or dried prior to recycling into a typical uranium recovery process known to those skilled in the art.

Also in accordance with the first preferred embodiment, the filtrate from the above filtration, containing the molybdenum values is reacted with a 20 wt % solution of calcium chloride. Although other calcium salts can be used in this step, e.g., calcium bromide, calcium nitrate, calcium hydroxide, calcium oxide and the like, calcium chloride is preferred for economic reasons and a favorable reaction rate. The concentration of the calcium chloride solution is not critical and can range from 5% to as high as 70%. Lower concentrations generate additional aqueous waste which must be disposed and higher concentration can lead to thick slurries which are difficult to stir and thus may affect the final purity of the desired calcium salt, calcium molybdate, $CaMoO_4$. The addition reaction is carried out at ambient conditions, e.g., at around 25° C., as this is the most economical condition for the process. After stirring for 1 hour, the reaction is complete and the precipitated calcium molybdate can be isolated by standard filtration techniques known to those skilled in the art. The product is conveniently dried by heating at 100° C. This product contains a small quantity of fluoride as calcium fluoride, $CaF_2$. The calcium molybdate is suitable for use in the applications described above.

The invention will be further illustrated by the following examples. It will be understood, however, that although the examples may describe in detail certain preferred operation conditions of the invention, the examples are provided primarily for purposes of illustration and the invention in its broad aspects is not limited thereto. For example, while batch uranium hexafluoride processing processes are detailed herein, the processing of the present invention can be practiced in continuous processing as well, e.g., by periodically and/or continuously taking a portion of heavy distillate from the elevated pressure distillation, and then subjecting that portion to reduced pressure distillation.

EXAMPLE 1

This example details the process for removal of uranium hexafluoride from the high boiler composite sample.

A nickel cylinder containing 1289.4 g of high boiler components was subjected to distillation. The cylinder was heated to 60° C. and the vacuum maintained between 200-220 mm Hg during the distillation. After 3 hours of distillation there was no observable change in weight of the cylinder. The distillation was terminated and the product cylinder weighed. A total of 213.3 g of distillate was obtained which consisted of pure $UF_6$. Analysis of this distillate fraction indicated that no molybdenum contamination of the distillate product has occurred. The molybdenum value was ≤1 ppm. The high boiler composite contained 16.55% recoverable $UF_6$.

EXAMPLE 2

This example is presented to document the UF6 remaining after the distillation described in Example 1.

A 25 g sample of liquid obtained from Example 1 was analyzed for residual uranium. It was determined that the uranium content was equal to 2340 ppm.

EXAMPLE 3

This example illustrates the process for removal of the residual uranium and fluoride from the hydrolyzed distillate produced after performing the distillation described in Example 1.

A 93.1 g sample of the material remaining after the distillation as described in Example 1 which will now contain the bulk of the molybdenum as $MoOF_4$ was hydrolyzed by adding 100 g of distilled water. To this resulting slightly yellow solution was added a 20 wt % solution of sodium hydroxide until the pH of the final solution was 10.0. This required the addition of 600 ml of NaOH solution. The resulting slurry was stirred for 1 hour then filtered. The resulting yellow solid was dried at 100° C. to yield 86.15 g of NaF contaminated with the remaining uranium as sodium diuranate.

EXAMPLE 4

This example illustrates the process for producing and isolating the molybdenum values as calcium molybdate, $CaMoO_4$.

To the colorless filtrate from Example 3 was added 325 ml of 20 wt % $CaCl_2$ solution. A white precipitate formed immediately. The slurry is stirred for 1 hour at 25° C. followed by filtration and washing. The resulting calcium molybdate was analyzed and found to contain 2.6% fluoride as calcium fluoride and a uranium value of ≤2 ppm.

EXAMPLE 5

This Example illustrates the use of 40 wt % NaOH and follows the procedures described in Examples 3 and 4, which takes this process to the final product, $CaMoO_4$.

The analysis obtained for the final product $CaMoO_4$ was: U≤1 ppm; 1.9% fluoride as calcium fluoride.

EXAMPLE 6

This example illustrates the use of 50 wt % NaOH and follows the procedures described in Examples 3 and 4 to isolate the final product $CaMoOF_4$. A uranium concentration was determined and found to be U≤1.6 ppm.

What is claimed is:

1. A method of manufacturing uranium hexafluoride comprising the steps of:
   feeding crude uranium hexafluoride comprising molybdenum impurities into a boiler still for processing;
   distilling at an elevated pressure greater than atmospheric pressure said crude uranium hexafluoride in said boiler still such that substantially pure uranium hexafluoride is recovered as a first light distillate product; and
   distilling a heavy distillate product from said elevated pressure distillation, the product including uranium hexafluoride and molybdenum oxytetrafluoride, at a reduced pressure lower than atmospheric pressure to recover substantially pure uranium hexafluoride as a second light distillate product.

2. The method according to claim 1, further comprising the step of hydrolzing a solid heavy distillate product from said reduced pressure distillation with water to form a solution comprising hydrofluoric acid, hydrolyzed molybdenum, and uranyl fluoride.

3. The method according to claim 2, further comprising the step of reacting the solution with sodium hydroxide to precipitate uranium as sodium diuranate and fluoride as sodium fluoride.

4. The method according to claim 3, further comprising the step of reacting a liquor from the sodium hydroxide treatment step with a calcium salt to precipitate molybdenum as calcium molybdate.

5. The method according to claim 4, wherein the calcium salt is calcium chloride.

6. The method according to claim 4, further comprising the step of isolating the calcium molybdate by filtration and drying.

7. The method according to claim 6, wherein the isolated calcium molybdate contains less than about 300 ppm uranium.

8. The method according to claim 7, wherein the isolated calcium molybdate contains less than about 1 ppm uranium.

9. The method of claim 1, wherein the reduced pressure distillation is conducted at a pressure of less than about 50 kPa.

10. The method of claim 1, wherein said the reduced pressure distillation is conducted at a pressure of between about 20 kPa and 35 kPa.

11. The method of claim 1, wherein the reduced pressure distillation is conducted at a pressure of about 28 kPa.

12. The method of claim 1, wherein the reduced pressure distillation is conducted at a temperature of between about 50° C. and 70° C.

13. The method of claim 1, wherein the reduced pressure distillation is conducted at a temperature of about 60° C.

14. A method of manufacturing uranium hexafluoride comprising the steps of:
   feeding crude uranium hexafluoride comprising molybdenum impurities into a boiler still for processing;
   distilling at an elevated pressure greater than atmospheric pressure the crude uranium hexafluoride in the boiler still such that substantially pure uranium hexafluoride is recovered as a first light distillate product;
   distilling a heavy distillate product from said elevated pressure distillation step, the product including uranium hexafluoride and molybdenum oxytetrafluoride, at a reduced pressure of less than about 50 kPa to recover substantially pure uranium hexafluoride as a second light distillate product;

hydrolyzing a heavy distillate product from said reduced pressure distillation step with water to form a solution comprising hydrofluoric acid, hydrolyzed molybdenum, and uranyl fluoride;

reacting the solution with sodium hydroxide to precipitate uranium as sodium diuranate and fluoride as sodium fluoride; and reacting a liquor from said sodium hydroxide treatment step with a calcium salt to precipitate molybdenum as calcium molybdate.

15. The method of claim 14, wherein said the reduced pressure distillation is conducted at a pressure of between about 20 kPa and 35 kPa.

16. The method of claim 14, wherein said reduced pressure distillation step is conducted at a temperature of between about 50° C. and 70° C.

17. The method of claim 14, wherein the calcium molybdate precipitate contains less than about 300 ppm uranium.

18. The method of claim 17, wherein the calcium molybdate precipitate contains less than about 1 ppm uranium.

19. The method of claim 14, wherein the reduced pressure distillation is conducted at a pressure of less than about 50 kPa.

* * * * *